US006065604A

United States Patent [19]

Storck

[11] Patent Number: 6,065,604

[45] **Date of Patent: *May 23, 2000**

[54] ARTICLE HOLDING TRAY

[76] Inventor: Lawrence O. Storck, 3736 Malec Cir., Sarasota, Fla. 34233

[ * ] Notice: This patent is subject to a terminal disclaimer.

[21] Appl. No.: 09/240,366

[22] Filed: Jan. 27, 1999

Related U.S. Application Data

[63] Continuation of application No. 08/881,708, Jun. 24, 1997, Pat. No. 5,871,098.

[51] Int. Cl.[7] .............................. B65D 1/34; B23Q 3/00; B25H 1/00

[52] U.S. Cl. .......................... 206/557; 206/560; 206/565; 269/9; 269/315; 144/286.5; 144/307

[58] Field of Search .................................... 206/557, 559, 206/560, 565; 269/303, 305, 315, 9, 10, 318; 229/904; 144/286.1, 286.5, 135.2, 307

[56] References Cited

U.S. PATENT DOCUMENTS

| | | |
|---|---|---|
| 2,288,218 | 6/1942 | Warren . |
| 4,002,329 | 1/1977 | Petrowski . |
| 4,494,755 | 1/1985 | Caillouet . |
| 4,659,099 | 4/1987 | Malone . |
| 4,662,676 | 5/1987 | Havelock . |
| 4,864,941 | 9/1989 | Goulter . |
| 4,940,003 | 7/1990 | Mayhew et al. . |
| 5,100,001 | 3/1992 | Brooks . |
| 5,176,274 | 1/1993 | Jenkins . |
| 5,259,528 | 11/1993 | Pace et al. . |
| 5,425,455 | 6/1995 | Miller et al. . |
| 5,499,802 | 3/1996 | Haberle . |
| 5,558,391 | 9/1996 | Chavous . |
| 5,647,420 | 7/1997 | Michell . |
| 5,732,937 | 3/1998 | Morghen . |

*Primary Examiner*—Paul T. Sewell
*Assistant Examiner*—J. Mohandesi
*Attorney, Agent, or Firm*—Charles J. Prescott

[57] ABSTRACT

An article holding tray adapted to retain and stabilize a wide variety of articles during their use such as dishware, drinking glasses, eating utensils, video game joy sticks and other articles which are typically usable on a tray or lap tray. The device includes a generally flat tray or board which includes one or more connected elongated slots formed orthogonally through the tray and sized in width for slidable translation of an elongated threaded fastener therealong. Each threaded fastener releasably retains an elongated movable retaining block in a selected position against an upper support surface defined by the tray. Each movable retaining block has at least one side surface, and preferably all of the side surfaces, which is sloped at an angle substantially greater than 90 degrees, and preferably about 105 degrees, with respect to the lower flat surface of the retaining block and the support surface. This creates a wedge effect which forces articles in contact with each surface against the support surface. Two or more such slanted side surfaces slidably and rotateably positioned at different locations against an edge or side of an article immobilize the article on the tray.

2 Claims, 3 Drawing Sheets

ARTICLE HOLDING TRAY

This is a continuation application of Ser. No. 08/881,708 filed Jun. 24, 1997, now U.S. Pat. No. 5,871,098.

BACKGROUND OF THE INVENTION

1. Scope of Invention

This invention relates generally to trays and tables, and more particularly to an article holding tray for releasably retaining a wide range of articles supported thereatop during use.

2. Prior Art

Numerous devices are disclosed in prior art which are intended to assist in the retention of articles either during use or while being held for work effort as follows:

| | |
|---|---|
| U.S. Pat. No. 4,864,941 | Goulter |
| U.S. Pat. No. 4,002,329 | Petrowski |
| U.S. Pat. No. 4,494,755 | Caillouet, Jr. |
| U.S. Pat. No. 4,940,003 | Mayhew et al. |
| U.S. Pat. No. 4,659,099 | Malone |
| U.S. Pat. No. 4,662,676 | Havelock |
| U.S. Pat. No. 5,100,001 | Brooks |
| U.S. Pat. No. 5,558,391 | Chavous |

A number of these prior art devices are associated with the holding of an article on a tray and the like for retaining a utilitarian object thereon such as a cup or a dish. The '391 patent to Chavous teaches a tray with a removable object supporting insert. The shape of the tray is particularly adapted for disabled persons seated in a wheelchair and apparently provides for a number of custom inserts, each of which has a different functional object such as a dish or bowl connected thereto.

Brooks, in the '001 patent, teaches a tray with plate fasteners for immobilizing a specially structured plate which interacts with tie-down straps connected between the margin of the plate and the tray. The device as disclosed by Havelock in '676 and by Malone in the '099 patent teach trays utilized in conjunction with wheelchair armrests for holding articles in place thereatop.

A car seat table as disclosed by Mayhew, in the '003 U.S. patent, is designed for securement on a horizontal seat portion of a rear vehicle seat by utilizing a conventional seatbelt. A specially designed holder or tray for a joystick control for video games is disclosed by Caillouet, in the above-referenced '755 patent.

Associated with workpiece operations, the '329 patent invented by Petrowski teaches a workpiece support device for use with a table of a power saw. This workpiece holder is connected to a guide member for both rotational and translational movement during positioning and cutting of a workpiece. A folding bench invented by Goulter and disclosed in the above-referenced '941 patent teaches a workbench which includes an adjustable work holder which is slidably positionable within grooves or slots and having an upright object support surface which bears against a workpiece for retention.

The present invention provides a versatile article holding tray which includes a plurality of elongated moveable retaining blocks each being held for sliding and rotational positioning during placement and then for securement by threaded fasteners against the support surface of the tray. Each of the moveable retaining blocks includes at least one side surface which is slanted or sloped at an acute angle with respect to the support surface and an obtuse angle with respect to the bottom surface of the retaining block so that, when two or more such blocks are pressed or made to bear against an edge of an article, a downward trapping or retaining force is exerted to prevent the article being held from further movement, even when the tray is tipped or turned upside down.

BRIEF SUMMARY OF THE INVENTION

This invention is directed to an article holding tray adapted to retain and stabilize a wide variety of articles during their use such as dishware, drinking glasses, eating utensils, video game joy sticks and other articles which are typically usable on a tray or lap tray. The device includes a generally flat tray or board which includes one or more connected elongated slots formed orthogonally through the tray and sized in width for slidable translation of an elongated threaded fastener therealong. Each threaded fastener releasably retains an elongated movable retaining block in a selected position against an upper support surface defined by the tray. Each movable retaining block has at least one side surface, and preferably all of the side surfaces, which is Sloped at an angle substantially greater than 90 degrees, and preferably about 105 degrees, with respect to the lower flat surface of the retaining block and the support surface. This creates a wedge effect which forces articles in contact with each surface against the support surface. Two or more such slanted side surfaces slidably and rotateably positioned at different locations against an edge or side of an article immobilize the article on the tray.

It is therefore an object of this invention to provide an article holding tray having the versatility to hold and immobilize a wide range of articles during use in a stationary position atop the tray.

It is another object of this invention to provide an article holding tray which may be quickly configured to retainingly engage around a broad range of articles to be held atop the tray during use.

It is still another object of this invention to provide an article holding tray which will retain certain of the articles to be held in secure position atop the tray even when the tray is tipped or even turned upside down.

In accordance with these and other objects which will become apparent hereinafter, the instant invention will now be described with reference to the accompanying drawings.

DETAILED DESCRIPTION OF THE INVENTION

Figure 2:
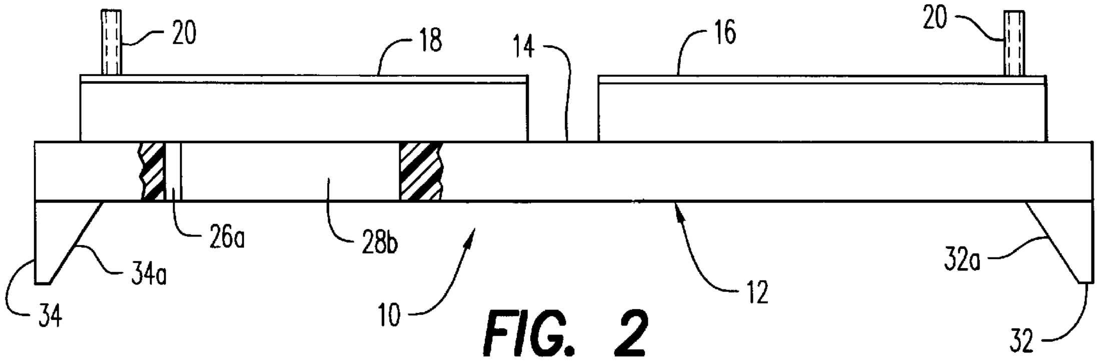
FIG. 2 is a side elevation partially broken view of the invention shown in FIG. 1.
Figure 1:
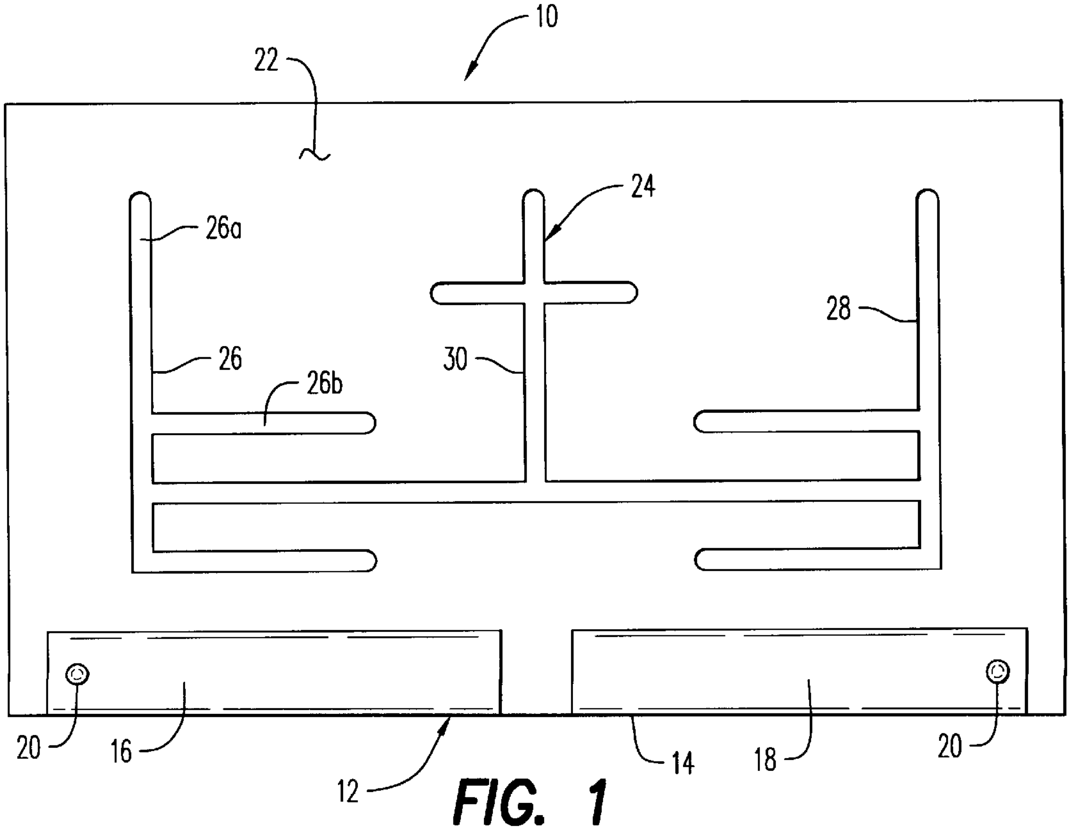
FIG. 1 is a top plan view of the invention.
Figure 3:
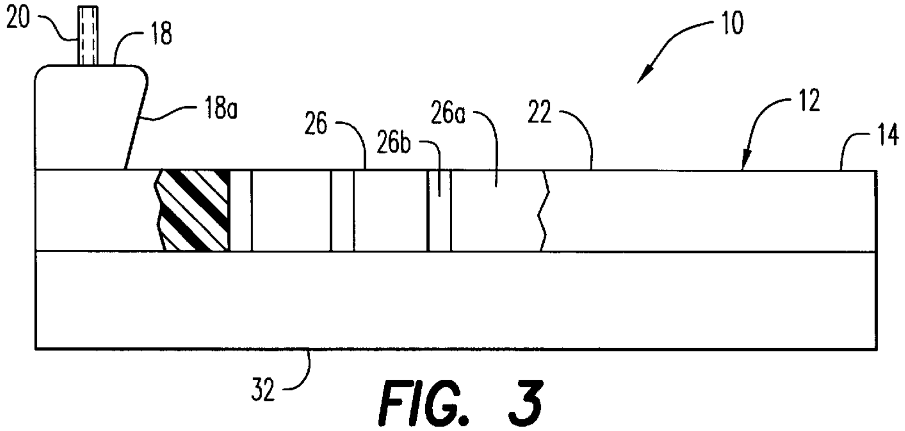
FIG. 3 is an end elevation partially broken view of the invention shown in FIG. 1.

Referring now to the drawings, and particularly to FIGS. 1, 2 and 3, the invention is shown generally at numeral 10 and includes an article holding tray 12 comprised of a generally flat, rectangular tray or board 14 which is fabricated of molded plastic, wood and the like. Elongated lap stabilizing edges 32 and 34 are connected along the end margins of the tray 14. These edges 32 and 34 include inwardly facing sloping or diagonal surfaces 32*a* and 34*a* which are shaped and spaced so as to stabilizing the device 10 when placed atop the user's upper legs and lap area.

The tray or board 14 includes a series or array 24 of either straight or arcuately formed slots shown typically at 26, 28 and 30. As shown typically at slot portions 26*a* and 26*b* as best seen in FIG. 2, these slots extend orthogonally through the tray 14 and are preferably interconnected end to end in a contiguous or continuous fashion. The size or width of each of the slots in array 24 is sufficient to allow for slidable translation of a preselected threaded bolt or fastener shown typically at 52 in FIG. 8 and described herebelow. Obviously, by this description, the precise configuration and orientation of the slot array 24 is not as significant as is the area of coverage of the array 24 over the support surface 22 atop which the articles are to be placed for retention.

Figure 8:
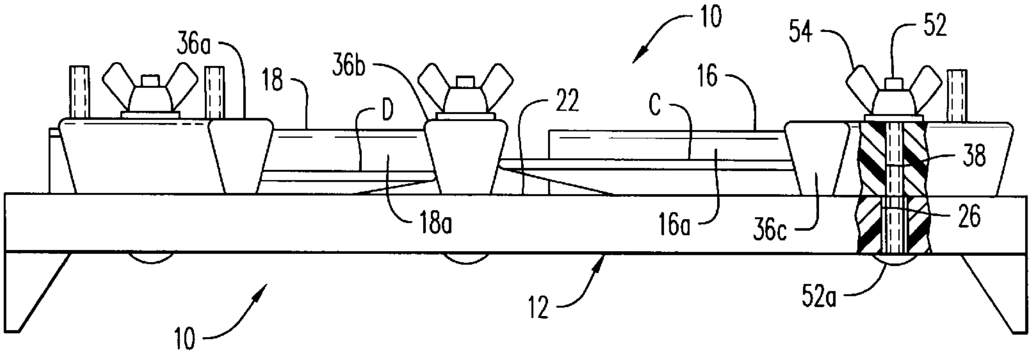
FIG. 8 is a side elevation view of FIG. 7.
Figure 7:
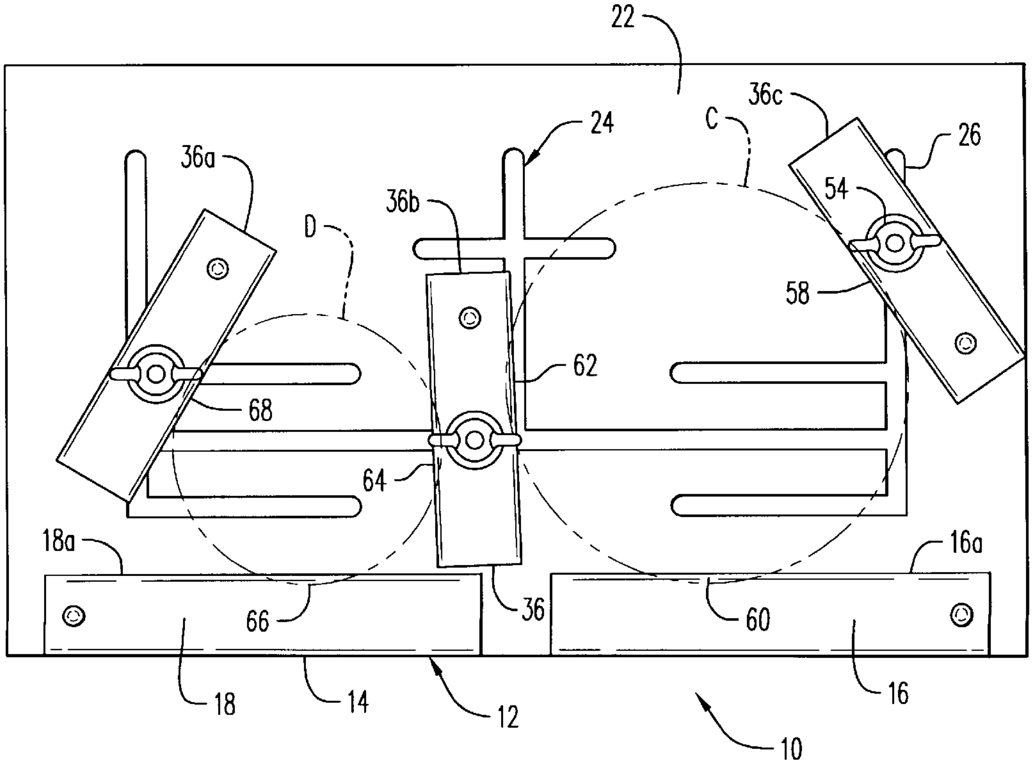
FIG. 7 is a top plan view of the invention shown in FIG. 1 with articles being held in position by a plurality of the retaining blocks shown in FIG. 4.

The preferred embodiment 10 further includes two spaced elongated stationary retaining blocks 16 and 18 secured along one side margin of the tray or base 14. As best seen in FIG. 3, the inwardly facing side surface 18*a* and 16*a* (as seen in FIGS. 7 and 8) are sloped or slanted inwardly toward the central portion of the tray 14 at an obtuse angle of preferably 105 degrees with respect to the lower surface of the retaining blocks 16 and 18 and at a corresponding acute angle of 75 degrees with respect to the support surface 22. These slanted side surfaces 16*a* and 18*a* represent an important general feature of the present invention which is provided to as to retainingly position at least some of the articles positioned atop the support surface 22 as will be described more fully herebelow.

Each of the stationary blocks 16 and 18 also includes an upwardly extending threaded shaft 20 disposed preferably at one end of each of the stationary blocks 16 and 18. The utility of these threaded shafts 20 are described herebelow with respect to the movable blocks 36.

Figure 5:
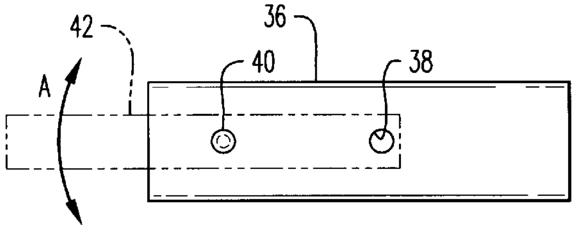
FIG. 5 is a top plan view of FIG. 4 showing the retaining clip in phantom.
Figure 6:
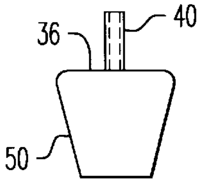
FIG. 6 is an end elevation view of the retaining block only of FIG. 4.
Figure 4:
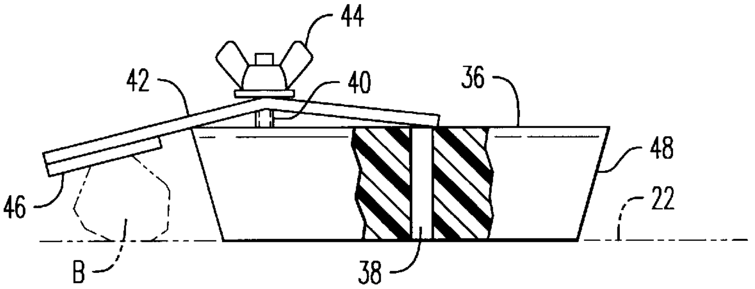
FIG. 4 is a side elevation partially broken view of a retaining block and optional retaining clip arrangement.

Now describing the movable blocks 36 in more detail, refer to FIGS. 4, 5 and 6 which show that these movable blocks 36 are elongated and formed of preferably molded plastic, wood material and the like and include a centrally positioned upright aperture 38 formed therethrough. As seen in FIG. 8, this aperture 38 is sized so as to receive an elongated threaded fastener 52 passing therethrough for securement of each of the movable blocks 36 against the support surface 22 after being slidably and rotationally positioned for use. Note that these movable blocks 36 may also be arcuate in plan view configuration and be within the intended scope of this invention.

Each of the movable blocks 36 also preferably includes an upwardly extending threaded shaft 40 similar to that described at 20 in FIGS. 1 and 2. These threaded shafts 40 are provided for retaining a separate retaining clip 42 formed of thin flat metal or plastic strip having a bend or kink transversely across a central portion thereof as seen in FIG. 4. By placement of the retaining clip 42 by a central aperture formed therethrough over the threaded shaft 40, a wing nut 44 may then be threadably engaged over the threaded shaft 40 as seen in FIG. 4. After the retaining clip 42 is pivotally oriented back and forth in the direction of arrow A about the threaded shaft 40, the wing nut 44 is tightened so as to press a fabric patch 46 disposed on a lower surface of one end of the retaining clip 42 against an article shown generally at B. By this arrangement, the article B is held in position atop the support surface 22 in a desired or selected position.

As seen in FIGS. 4 and 6, the moveable blocks 36 include side surfaces 50 and end surfaces 48 which are sloped or slanted at an obtuse angle of preferably 105 degrees with respect to the bottom surface of the moveable block 36 and, correspondingly, at an acute angle of 75 degrees with respect to the support surface 22.

Referring now to FIGS. 7 and 8, the invention 10 is shown in use retaining two articles in the form of a plate and a saucer shown in phantom at C and D, respectively. The articles C and D are first positioned as desired on the support surface 22 and at 60 and 66 against the inwardly facing slanted surfaces 16*a* and 18*a* as previously described. One of the moveable blocks 36*b* is positioned centrally so that an edge portion of plate C may be lockably engaged at 62, while an edge portion of plate D may be lockably engaged at 64 against the sloped sides of the moveable block 36*b*. Likewise, movable blocks 36*a* and 36*c* are strategically positioned so as to lockably engage plate D at 68 and plate C at 58. By this arrangement, each of the plates C and D are lockably engaged by the inwardly sloping or slanted side surfaces of the movable blocks 36 and one of the stationary blocks 16 or 18.

Initial positioning of each of the moveable blocks 36 is accomplished when the wing nut 54 on threaded fastener 52 is loosened so that each of the moveable blocks 36 may be slidably positioned as desired within one of the slot segments of the slot array 24 and then rotationally positioned about the threaded fastener 52 as desired prior to tightening of wing nut 54. The head 52*a* of the threaded fastener 52 tightenably engages against a bottom surface of tray 14.

By this arrangement, any article which includes an edge surface which can be urged against and trapped by at least two of the slanted surfaces of either a moveable block 36 or one of the stationary blocks 16 or 18 will not only be secured from lateral movement, but will also be secured from tipping or even being dislodged should the tray be turned upside down. For articles which have generally upright surfaces from the bottom thereof upwardly to at least the height of the moveable and fixed blocks, securement from lateral movement atop the support surface 22 is still accomplished by suitable positioning and releasable retention of one or more of the blocks 36 acting together or in conjunction with the fixed blocks 16 and 18. Retaining clips 42 may also be utilized for retaining article such as utensils, flat plates and the like.

One ideal application of the present invention with respect to the securement of a joy stick controller for use with video games. Another application well suited for the present invention is the securement of dishes and glassware which are rendered at least laterally immobilized, and with respect to plates as above described, rendered non-tipable as well.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An article holding tray adapted for releasable retention and stabilization when placed thereon of a wide variety of sizes and shapes of articles during use comprising:

a generally flat tray having an upwardly facing substantially flat support surface and a bottom surface;

an array of elongated slots each interconnected one to another in a substantially contiguous or continuous fashion and formed through said tray substantially orthogonally to said support surface, said array of slots extending over a substantial central portion, but not to an edge of, said tray;

a plurality of movable elongated retaining blocks each including an elongated threaded fastener passing uprightly therethrough, each said retaining block selectively positionable atop said support surface with a corresponding said elongated threaded fastener positioned through said slot, each said retaining block being secured against said support surface by said threaded fastener by tightening thereof;

each said retaining block including one side surface thereof which is oriented or slanted at an acute angle substantially less than 90 degrees with respect to said support surface whereby an edge or perimeter surface of an article which is held against said side surface is retainingly forced downwardly against said support surface.

2. An article holding tray adapted for releasable retention and stabilization of a wide variety of sizes and shapes of articles during use atop said holding tray comprising:

a tray having an upwardly facing substantially flat support surface and a bottom surface;

a plurality of elongated slots each connected one to the next in continuous fashion, each said slot formed into said support surface and through said tray, said array of slots extending over a substantial central portion of, but not to an edge of, said tray;

a plurality of movable elongated retaining blocks each including a clamping means connected and downwardly extending through and slidably movable within and along any of said slots as desired for securing a corresponding said retaining block atop said support surface in a selected position and angular orientation with respect to said array of slots;

each said retaining block including one side surface thereof which is oriented or slanted at an acute angle of less than 90 degrees with respect to said support surface whereby an edge or perimeter surface of an article which is held against said side surface is retainingly forced downwardly against said support surface.

* * * * *